United States Patent
Dunn et al.

(10) Patent No.: US 8,537,048 B2
(45) Date of Patent: Sep. 17, 2013

(54) ACTIVE CHAFF

(75) Inventors: Michael J. Dunn, Federal Way, WA (US); Brian Kenneth Kormanyos, Edmonds, WA (US); Thomas H. Friddell, Kent, WA (US)

(73) Assignee: The Boeing Company, Chicago, IL (US)

( * ) Notice: Subject to any disclaimer, the term of this patent is extended or adjusted under 35 U.S.C. 154(b) by 422 days.

(21) Appl. No.: 12/239,434

(22) Filed: Sep. 26, 2008

(65) Prior Publication Data

US 2010/0283655 A1 Nov. 11, 2010

(51) Int. Cl.
*G01S 7/38* (2006.01)

(52) U.S. Cl.
USPC .............................................. 342/12; 342/14

(58) Field of Classification Search
USPC ........................................................ 342/12
See application file for complete search history.

(56) References Cited

U.S. PATENT DOCUMENTS

| | | | | |
|---|---|---|---|---|
| 3,126,544 A * | 3/1964 | Greatbatch, Jr. | ................... | 342/9 |
| 3,909,828 A * | 9/1975 | Israel et al. | ...................... | 342/15 |
| 4,149,166 A * | 4/1979 | Null | ................... | 342/13 |
| 4,446,793 A * | 5/1984 | Gibbs | ........................... | 102/505 |
| 4,683,824 A * | 8/1987 | Gibbs | ........................... | 102/436 |
| 5,406,287 A * | 4/1995 | Pinkus | ............................ | 342/13 |
| 5,786,786 A * | 7/1998 | Small | ............................. | 342/13 |
| 6,384,765 B1 * | 5/2002 | Sjostrand et al. | ............... | 342/15 |
| 6,429,800 B1 * | 8/2002 | Richmond | ..................... | 342/14 |
| 6,542,109 B2 * | 4/2003 | Lloyd et al. | ..................... | 342/14 |
| 6,628,239 B1 * | 9/2003 | Hilliard et al. | ................ | 343/850 |
| 6,662,700 B2 * | 12/2003 | O'Neill | .......................... | 89/1.11 |
| 7,369,081 B1 * | 5/2008 | Ganz et al. | ....................... | 342/12 |
| 7,400,287 B2 * | 7/2008 | Saccomanno | ................... | 342/12 |
| 7,523,692 B1 * | 4/2009 | Burns | .............................. | 89/1.1 |
| 7,533,615 B1 * | 5/2009 | Ganz et al. | ..................... | 102/505 |
| 2002/0145554 A1 * | 10/2002 | Lloyd et al. | ..................... | 342/13 |
| 2005/0062638 A1 * | 3/2005 | Zeineh | ............................ | 342/13 |
| 2005/0134496 A1 * | 6/2005 | Trainor | ........................... | 342/14 |
| 2006/0000988 A1 * | 1/2006 | Stuart et al. | ............... | 250/504 R |
| 2007/0190368 A1 * | 8/2007 | Jung et al. | ..................... | 428/919 |
| 2008/0035784 A1 | 2/2008 | Meserole et al. | | |

(Continued)

FOREIGN PATENT DOCUMENTS

JP 63122978 A * 5/1988

OTHER PUBLICATIONS

Veenstra, H. et al., "A 19-23 GHz integrated LC-VCO in a production 70 GHz fT SiGe technology", pp. 349-352, (2003).
Hamed, K.W. et al., "A 26 GHz integrated differential DRO implemented using SiGe-HBT technology", pp. 657-660, (2007).

(Continued)

*Primary Examiner* — Matthew M Barker
(74) *Attorney, Agent, or Firm* — Klintworth & Rozenblat IP LLC

(57) ABSTRACT

An active chaff may be released by an aircraft to assist the aircraft in evading at least one of radar detection and a missile. The active chaff may include a signal generator, a signal spreading device, a microprocessor, a power source, and a substantially high-drag aerodynamic envelope. The signal generator may emit a signal to assist the aircraft in evading radar detection and/or a missile. The signal spreading device may spread the generated signal. The microprocessor may control the signal generator and the signal spreading device. The power source may power the signal generator and the microprocessor. Each of the signal generator, signal spreading device, microprocessor, and power source may be located on or within the substantially high-drag aerodynamic envelope.

17 Claims, 4 Drawing Sheets

(56) References Cited

U.S. PATENT DOCUMENTS

| | | |
|---|---|---|
| 2008/0035789 A1 | 2/2008 | Lewis et al. |
| 2008/0185949 A1* | 8/2008 | Jebsen et al. ............. 313/231.41 |
| 2008/0198060 A1* | 8/2008 | Shani et al. .................... 342/14 |

OTHER PUBLICATIONS

Kormanyos, B.K. et al., "20-GHz power combining slot-oscillator array", vol. 4, No. 7, pp. 226-228, (1994).

* cited by examiner

ACTIVE CHAFF

FIELD OF THE DISCLOSURE

The disclosure relates to active chaffs which are designed to assist aircraft in evading radar detection, missiles, and/or other types of devices and/or detection systems, and to methods of their use.

BACKGROUND OF THE DISCLOSURE

In combat, aircraft are often threatened by attack from other aircraft, guided missiles, and/or artillery upon being detected with radar and/or other types of detection systems. In order to avoid such attacks, is it desirable to interfere with the functioning of a radar detection system, and/or other type of detection system, used to direct the weapons at the threatened aircraft. One existing approach to attempting to avoid these types of detection systems is a passive chaff. A passive chaff is typically conductive ribbon, chopped to a quarter-wavelength of the threat radar frequency, and dispensed from the defending aircraft to form clouds that will be suspended in air for intervals of minutes. By strongly scattering radio waves, the chaff cloud functions similarly to a fog bank in front of a searchlight and the strong, backward-scattered reflection of the radar beam may prevent the radar from seeing objects behind the cloud. However, the passive chaff may be penetrated by range-gating the radar receiver, so that the backscattered signal from the chaff cloud may be precluded from being received by the radar at the same time as any target return. Another existing approach to attempting to avoid these types of detection systems is on-board jamming. In this approach, the defending aircraft may carry radio transmission equipment that may be used to interfere with threat radars by a variety of techniques, such as overwhelming the radar receiver with a strong continuous signal, so that the radar cannot detect reflected ranging signals. Thus, the defending aircraft may give up its directional position in order to conceal other vial information about itself. Other techniques may corrupt the threat radar's signal processing logic and render it ineffective. However, the jamming aircraft may be vulnerable to detection and interception, and the jamming aircraft must remain in the vicinity of the threat radar in order to suppress its function.

A system and method is needed to decrease one or more problems associated with one or more of the existing systems and methods of aircraft evading radar detection, missiles, and/or other types of devices and/or detection systems.

SUMMARY OF THE DISCLOSURE

In one aspect of the disclosure, an active chaff is provided to be, released by an aircraft to assist an aircraft in evading at least one of radar detection and a missile. The active chaff may, comprise: a signal generator for generating at least one signal to assist an aircraft in evading at least one of radar detection and a missile; a signal spreading device for spreading a generated signal; a microprocessor to control the signal generator and the signal spreading device; a power source for powering the signal generator and the microprocessor; and a substantially high-drag aerodynamic envelope.

In another aspect of the disclosure, a method of an aircraft evading at least one of radar detection and a missile is disclosed. In one step, an active chaff may be released during flight of an aircraft. In another step, at least one signal may be generated from a signal generator of the released active chaff to assist the aircraft in evading at least one of radar detection and a missile. In yet another step, the at least one emitted signal may be spread using a signal spreading device. In an additional step, the signal generator and the signal spreading device may be controlled using a microprocessor. In another step, the signal generator and the microprocessor may be powered using a power source.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
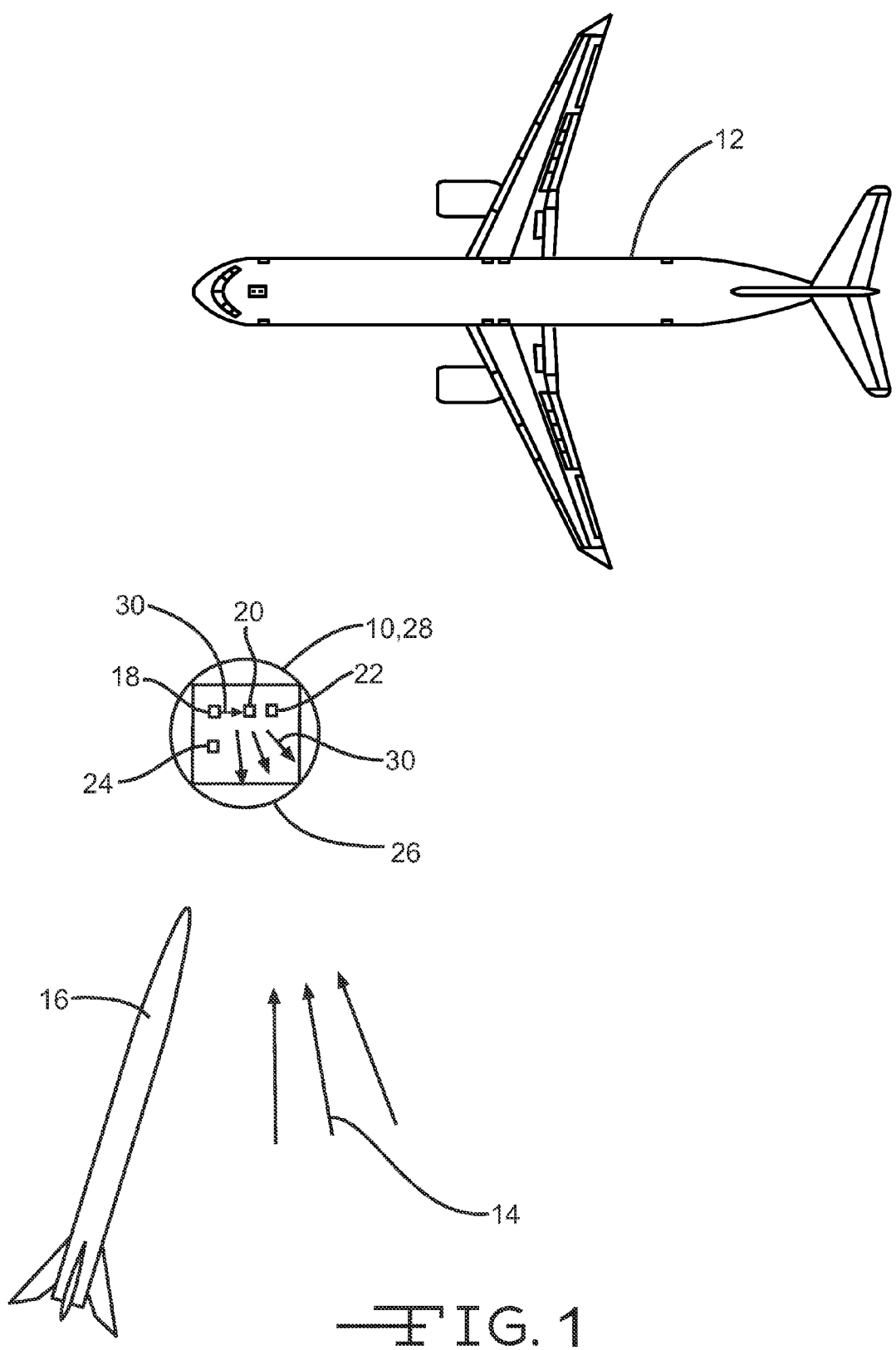
FIG. 1 shows a block diagram of an active chaff to be released by an aircraft to assist the aircraft in evading at least one of radar detection, a missile, and/or another type of device and/or detection.

FIG. 1 shows a block diagram of an active chaff 10 to be released by an aircraft 12 to assist the aircraft 12 in evading at least one of radar detection 14 and a missile 16. The radar detection 14 being evaded may comprise radio-frequency-based radar detection, light-based radar detection, infrared-based radar detection, and/or another type of radar detection. In other embodiments, the active chaff 10 may be used to assist an aircraft 12 in evading varying types of devices and/or detection. The active chaff 10 may be macroscopic, may be lightweight, may have all-weather operation, may be environmentally compatible and degradable, and may comprise at least one of a signal generator 18, a signal spreading device 20, a microprocessor 22, a power source 24, a physical substrate 26, and a substantially high-drag aerodynamic envelope 28. In other embodiments, the active chaff 10 may include other types of components. The longest dimension of the active chaff 10 may range from 4 to 25 millimeters, and the weight of the active chaff 10 may range from 25-100 milligrams. In other embodiments, the size and weight of the active chaff 10 may vary.

The signal generator 18 may emit at least one signal 30 to assist the aircraft 12 in evading radar detection 14 and/or a missile 16. The signal 30 may be designed to draw the radar 14 and/or missile 16 towards the chaff 10 and away from the aircraft 12. The signal emitter 18 may comprise a radio transmitter, and the signal 30 emitted by the radio transmitter may comprise at least one waveform. In another embodiment, the signal emitter 18 may comprise at least one light emitting diode, and the signal 30 emitted by the light emitting diode may comprise an infrared light, visual light, ultraviolet light, and/or another type of light.

The signal spreading device 20 may spread the emitted signal 30. The spreading device 20 may comprise one or more antennas for substantial isotropic radiation of the signal 30, which may be a radio waveform, emitted by the signal emitter 18, which may be a radio transmitter. In another embodiment, the spreading device 20 may comprise at least one of a dispersive lens and an optical scattering device for substantially isotropic spreading of the signal 30, which may be light, emitted by the signal emitter 18, which may be a light emitting diode.

The microprocessor 22 may control the signal generator 18 and the signal spreading device 20. The microprocessor 22 may comprise one or more micro-computers. The power source 24 may power the signal generator 18 and the microprocessor 22. The power source 24 may comprise a battery, a fuel cell, a capacitor, and/or another type of power source.

One or more of the signal generator 18, signal spreading device 20, microprocessor 22, and power source 24 may be mounted on the physical substrate 26, which may comprise a circuit board or other type of substrate. One or more of the physical substrate 26, signal emitter 18, spreading device 20, microprocessor 22, and power source 24 may be disposed on or within the substantially high-drag aerodynamic envelope 28.

Figure 2:
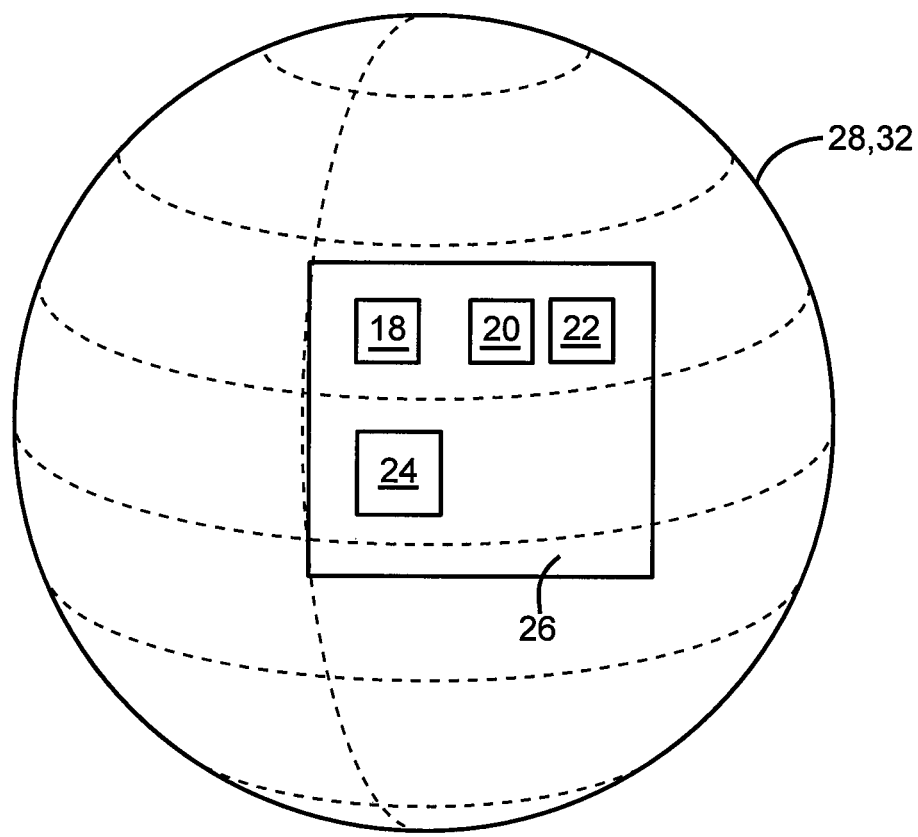
FIG. 2 shows a perspective view of one embodiment of a sphere-shaped, substantially high-drag aerodynamic envelope of an active chaff.
Figure 3:
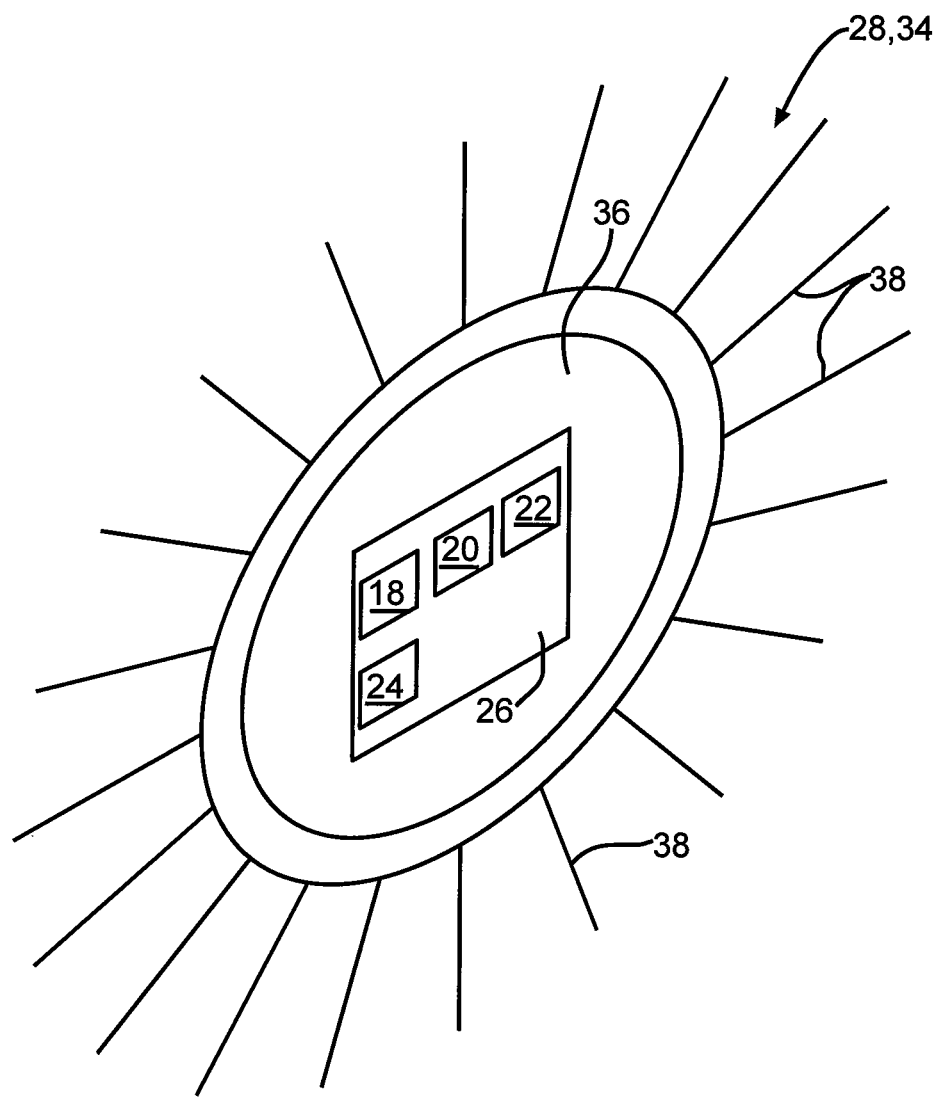
FIG. 3 shows a perspective view of another embodiment of a spoked-disk-shaped, substantially high-drag aerodynamic envelope of an active chaff.

As shown in the perspective view of FIG. 2, the substantially high-drag aerodynamic envelope 28 may comprise a sphere-shape 32 with one or more of the physical substrate 26, signal generator 18, signal spreading device 20, microprocessor 22, and power source 24 disposed on or within the sphere-shape 32. In another embodiment, as shown in the perspective view of FIG. 3, the substantially high-drag aerodynamic envelope 28 may comprise a spoked-disk shape 34. The spoked-disk shape 34 may comprise a disk 36 with spokes 38 extending from the disk 36, and one or more of the physical substrate 26, signal generator 18, signal spreading device 20, microprocessor 22, and power source 24 may be disposed on or within the spoked-disk shape 34.

In still other embodiments, the substantially high-drag aerodynamic envelope 28 may comprise varying shapes and/or configurations. In any of the embodiments, the signal generator 18, signal spreading device 20, microprocessor 22, and power source 24 may each be mounted on the physical substrate 26 which may be mounted on or within the substantially high-drag aerodynamic envelope 28. In still other embodiments, the components may be arranged in varying configurations and/or orientations.

Figure 4:
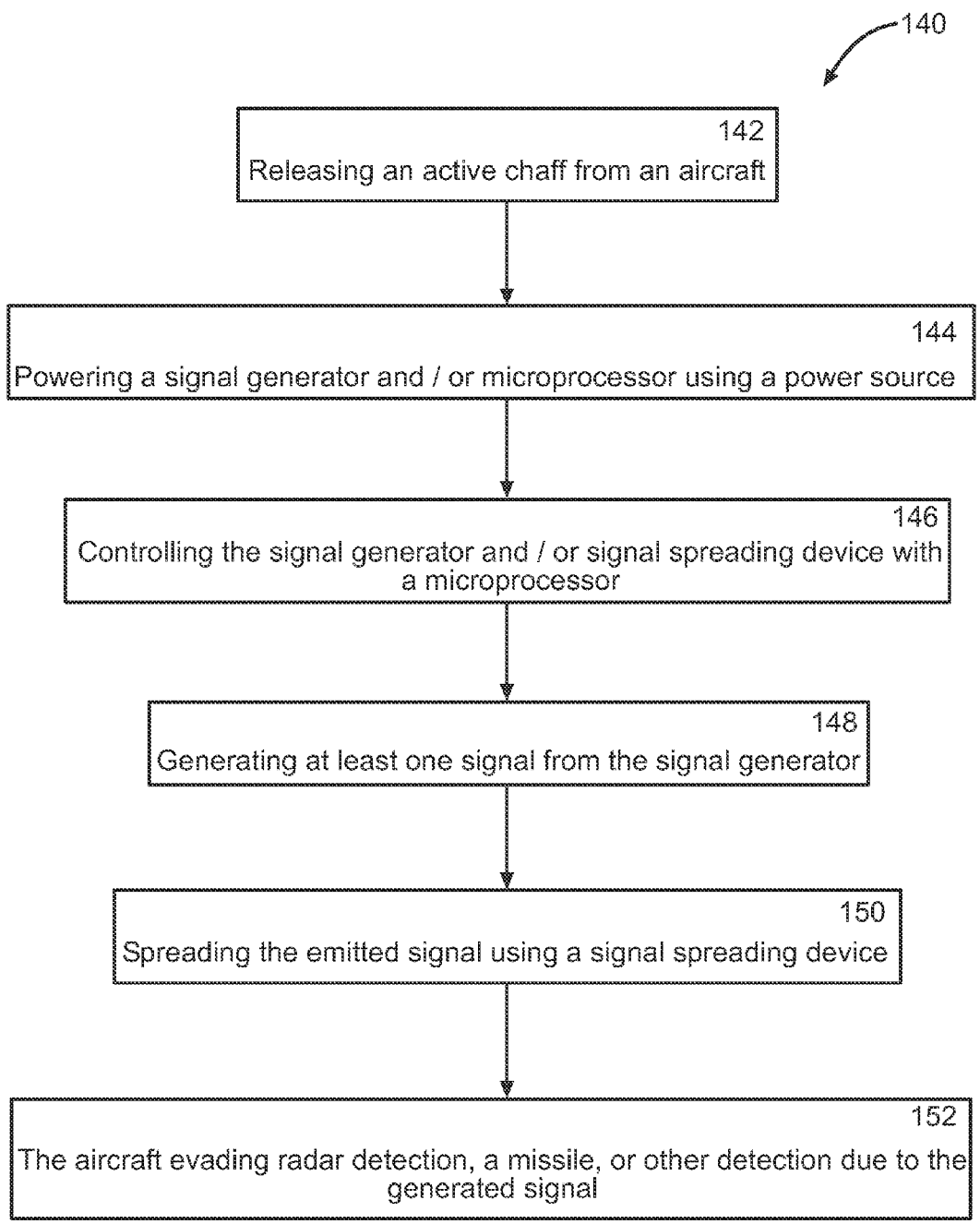
FIG. 4 shows a flow-chart of one embodiment of a method of an aircraft evading at least one of radar detection, a missile, and/or another type of device and/or detection.

FIG. 4 shows a flow-chart of one embodiment of a method 140 of an aircraft 12 evading at least one of radar detection 14, a missile 16, and/or another type of device and/or detection. In one step 142, one or more active chaffs 10 may be released during flight of the aircraft 12. In one embodiment, a cloud of active chaffs 10 may be released during the flight of the aircraft. The one or more active chaffs 10 may be macroscopic and may each comprise at least one of a signal generator 18, a signal spreading device 20, a microprocessor 22, a power source 24, a physical substrate 26, and a substantially high-drag aerodynamic envelope 28, all of which may be attached to each active chaff 10. The active chaffs 10 may be designed to fall from the sky to the ground solely under the force of gravity. The substantially high-drag nature of the aerodynamic envelope 28 may keep the active chaffs 10 in the air for a range of 5 to 30 minutes. In other embodiments, the active chaffs 10 may be designed to be in the air for varying ranges of time. In still other embodiments, the active chaffs 10 may be powered to fly for a period of time.

The signal generator 18 may comprise a radio transmitter. In another embodiment, the signal generator 18 may comprise at least one light emitting diode. The signal spreading device 20 may comprise an antenna. In another embodiment, the spreading device 20 may comprise at least one of a dispersive lens and an optical scattering device. The microprocessor 22 may comprise one or more computers. The power source 24 may comprise a battery, a fuel cell, a capacitor, and/or another type of power source. The physical substrate 26 may comprise a circuit board or other type of substrate. The substantially high-drag aerodynamic envelope 28 may comprise a sphere-shape 32. In another embodiment, the substantially high-drag aerodynamic envelope 28 may comprise a spoked-disk shape 34.

In one embodiment, for each active chaff 10, each of the signal generator 18, signal spreading device 20, microprocessor 22, and power source 24 may be mounted on or within the substantially high-drag aerodynamic envelope 28. This mounting may have been achieved by each signal generator 18, signal spreading device 20, microprocessor 22, and power source 24 having been mounted on the physical substrate 26 which may have been mounted on or within the substantially high-drag aerodynamic envelope 28. In other embodiments, each active chaff 10 may include other types of components, configurations, orientations, and/or attachments.

In another step 144, the signal generator 18 and/or microprocessor 22 may be powered using the power source 24. In yet another step 146, the signal generator 18 and/or the signal spreading device 20 may be controlled with a microprocessor 22. In another step 148, at least one signal 30 may be emitted from the signal emitter 18 of the released active chaff 10 to assist the aircraft 12 in evading radar detection 14, a missile 16, and/or another type of device and/or detection. The signal 30 may be designed to draw the radar 14 and/or missile 16 towards the chaff 10 and away from the aircraft 12. In one embodiment, the signal 30 emitted by the radio transmitter may comprise at least one waveform. In another embodiment, the signal 30 emitted by the light emitting diode may comprise an infrared light, visual light, ultraviolet light, and/or another type of light.

In an additional step 150, the emitted signal 30 may be spread using the spreading device 20. During this step, an antenna may substantially isotropically radiate at least one waveform emitted by a radio transmitter. In another embodiment, at least one dispersive lens and optical scattering device may substantially isotropically spread light emitted by a light emitting diode.

In still another step 152, the aircraft 12 may evade at least one of radar detection 14, a missile 16, and/or another type of device and/or detection due to the emitted signal 30 of the one or more active chaffs 10. The radar detection 14 being evaded may comprise radio-frequency-based radar detection, light-based radar detection, infrared-based radar detection, and/or another type of radar detection. In other embodiments, any of the steps 142-152 of the method 140 may be modified, reordered, and/or additional steps may be added.

One or more embodiments of the disclosure may reduce one or more problems associated with one or more of the existing systems and/or methods for assisting aircraft to avoid detection systems and/or missiles by providing one or more macroscopic active chaffs which may be ejected from the aircraft, and which may actively emit radio-frequency signals and/or various types of light to allow the aircraft time to get out of harm's way.

It should be understood, of course, that the foregoing relates to exemplary embodiments of the disclosure and that modifications may be made without departing from the spirit and scope of the disclosure as set forth in the following claims.

We claim:

1. An active chaff to be released by an aircraft to assist the aircraft in evading at least one of radar detection or a missile comprising:
   - a radio transmitter configured to generate at least one waveform to assist an aircraft in evading at least one of radar detection or a missile;
   - a signal spreading device configured to spread the at least one waveform;
   - a microprocessor configured to control the radio transmitter and the signal spreading device;
   - a power source configured to power the radio transmitter and the microprocessor; and
   - a substantially high-drag aerodynamic envelope;
   - wherein the active chaff has a longest dimension in a range of 4 to 25 millimeters and a weight in a range of 25 to 100 milligrams, and wherein the substantially high-drag aerodynamic envelope allows the active chaff to fall in air with high-drag under a force of gravity, prolonging a time the active chaff remains in the air, without the active chaff being self-propelled to fly.

2. The active chaff of claim 1 wherein the active chaff comprises a spoked-disk-shape having spokes extending from a disk.

3. The active chaff of claim 1 further comprising a physical substrate for mounting of the radio transmitter, the signal spreading device, the microprocessor, and the power source.

4. The active chaff of claim 1 wherein the radio transmitter, the signal spreading device, the microprocessor, and the power source are disposed at least one of on or within the substantially high-drag aerodynamic envelope.

5. The active chaff of claim 1 wherein the signal spreading device comprises an antenna for substantially isotropic radiation of the at least one waveform emitted by the radio transmitter.

6. The active chaff of claim 1 wherein the substantially high-drag aerodynamic envelope comprises a sphere.

7. A method of an aircraft evading at least one of radar detection or a missile comprising:
   - releasing an active chaff into air during flight of an aircraft, the chaff comprising a longest dimension in a range of 4 to 25 millimeters and a weight in a range of 25 to 100 milligrams, the chaff falling under the force of gravity without being self-propelled to fly;
   - generating at least one waveform from a radio transmitter of the released active chaff to assist the aircraft in evading at least one of radar detection or a missile;
   - spreading the at least one waveform using a signal spreading device;
   - controlling the radio transmitter and the signal spreading device using a microprocessor; and
   - powering the radio transmitter and the microprocessor using a power source.

8. The method of claim 7 wherein the signal spreading device, the microprocessor, and the power source are attached to the released active chaff.

9. The method of claim 7 wherein the released active chaff comprises a substantially high-drag aerodynamic envelope which causes the released active chaff to fall in the air with high-drag under the force of gravity, prolonging a time the released active chaff remains in the air.

10. The method of claim 9 wherein the radio transmitter, the signal spreading device, the microprocessor, and the power source are disposed at least one of on or within the substantially high-drag aerodynamic envelope.

11. The method of claim 9 wherein the substantially high-drag aerodynamic envelope comprises a sphere.

12. The method of claim 7 wherein the released active chaff comprises a spoked-disk-shape having spokes extending from a disk.

13. The method of claim 7 wherein the released active chaff comprises a physical substrate upon which the radio transmitter, the signal spreading device, the microprocessor, and the power source are mounted.

14. The method of claim 7 wherein the signal spreading device comprises an antenna and the spreading step comprises the antenna substantially isotropically radiating the at least one waveform generated by the radio transmitter.

15. The method of claim 7 further comprising the aircraft evading at least one of the radar detection or the missile due to the generated at least one waveform.

16. The method of claim 7 wherein the releasing step comprises releasing a plurality of active chaffs during flight of the aircraft.

17. The method of claim 7 wherein the released active chaff falls through the air under the force of gravity without the released active chaff being self-propelled to fly, after being released from the flying aircraft, for a range of 5 to 30 minutes.

* * * * *